(12) United States Patent
Jang et al.

(10) Patent No.: US 6,469,759 B2
(45) Date of Patent: Oct. 22, 2002

(54) METHOD FOR FABRICATING A REFLECTION TYPE LIQUID CRYSTAL DISPLAY

(75) Inventors: Yong-Kyu Jang, Suwon; Young-Kuil Joo, Yongin; Myeon-Koo Kang, Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/966,090

(22) Filed: Oct. 1, 2001

(65) Prior Publication Data

US 2002/0021390 A1 Feb. 21, 2002

Related U.S. Application Data

(62) Division of application No. 09/435,356, filed on Nov. 8, 1999, now Pat. No. 6,342,935.

(30) Foreign Application Priority Data

Nov. 6, 1998 (KR) .............................................. 98-47512

(51) Int. Cl.[7] .............................................. G02F 1/1335
(52) U.S. Cl. .......................................... 349/113; 438/30
(58) Field of Search ............................ 349/113; 438/30; 430/20

(56) References Cited

U.S. PATENT DOCUMENTS

| | | | | |
|---|---|---|---|---|
| 5,408,345 A | * | 4/1995 | Mitsui et al. | 349/42 |
| 5,805,252 A | * | 9/1998 | Shimada et al. | 349/113 |
| 5,949,507 A | * | 9/1999 | Shimada et al. | 349/113 |
| 6,038,008 A | * | 3/2000 | Kim et al. | 349/138 |
| 6,097,458 A | * | 8/2000 | Tsuda et al. | 349/113 |

* cited by examiner

Primary Examiner—Kenneth Parker
Assistant Examiner—David Chung
(74) Attorney, Agent, or Firm—McGuireWoods LLP; Hae-Chan Park (57) ABSTRACT

A reflection type liquid crystal display device having a reflection electrode with an enhanced reflectivity and a method for fabricating the same includes a dimple on a convex of the reflection electrode. The method for fabricating such a reflection type liquid crystal display uses a photo-sensitive organic insulation film to form bumps for the convex-concave structure, thus increases only the number of times of exposures, thereby simplifying the overall process.

15 Claims, 11 Drawing Sheets

METHOD FOR FABRICATING A REFLECTION TYPE LIQUID CRYSTAL DISPLAY

This application is a division of Ser. No. 09/435,356 filed on Nov. 8, 1999, now U.S. Pat. No. 6,342,935.

BACKGROUND OF THE INVENTION

1. Field of the Invention

The present invention relates to a liquid crystal display, and more particularly to a reflection type liquid crystal display having a reflection electrode provided with bumps and a method for fabricating the same.

2. Description of the Related Art

Cathode ray tubes (CRTs) used for displays like monitors of televisions or computers are not easy to install or move due to disadvantages of the larger, heavier, and power consumptive characteristics. To overcome such disadvantages, liquid crystal displays, plasma display panels, or flat panel displays using an electroluminescence element have been proposed and widely used.

High definition and multicolor display characteristics with less power consumption and lower voltage make the LCDs considered as one of most leading display device. In addition, LCDs are easy to manufacture, thus are widely used for various electronic devices.

There are two types of LCDs: a projection type display device using an external light source; and a reflection type display device using ambient lights.

The reflection type display is thin and light. It consumes less power because backlight devices are not necessary. It shows an excellent display outdoors. Thus, the reflection type displays are widely used for a portable device.

However, the current reflection type LCD has a dark screen and fails to show high definition and multicolor images. Therefore, the reflection type LCDs are employed for a low price product that requires a simple pattern display, such as, numbers.

To use a reflection type LCD for a portable information device with functions of a document viewer and an internet viewer, a high definition and a multicolor display with an enhanced reflection luminance are necessary. Such an enhancement in reflection luminance and high definition is also necessary to easily look at the monochromatic LCDs that mainly display character information. To achieve such an enhancement, it is necessary for the active matrix substrates to have switching elements, for example, thin film transistors. However, monochromatic LCDs have limits in displaying information, which may not call a high price. Therefore, thin film transistors having a high panel price may not be suitable for the monochromatic LCDs.

In the long run, it is required that the portable information devices are provided with a multicolor display function. The monochromatic LCDs will disappear, and the reflection type LCDs are under development to have a multicolor display function.

Despite the developing panel technologies and the expanding market, the reflection type multicolor LCDs are rarely available commercially. This is because the reflection type multicolor LCDs have a low performance in brightness, contrast, and a response time.

Two techniques are combined to obtain an improved brightness. One is enhancing a reflectivity of a reflection electrode, and the other is achieving a high aperture ratio. The reflectivity enhancement has been used for a conventional guest-host liquid crystal display device. Maximizing a reflectivity by allowing minute bumps to a reflection electrode is disclosed in U.S. Pat. No. 5,408,345 entitled "Reflection type liquid crystal display device wherein the reflector has bumps".

However, the ideal reflectivity has not yet been achieved, always requiring a reflectivity enhancement for the reflection type liquid crystal display devices.

Figure 1:
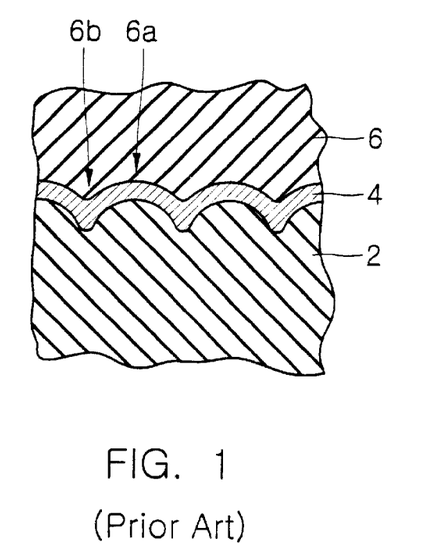
FIG. 1 is a schematic section view showing a reflection electrode and its adjacent portions of conventional reflection type liquid crystal display devices.

FIG. 1 is a schematic section view showing a reflection electrode of a conventional reflection type liquid crystal display device.

Figure 9:
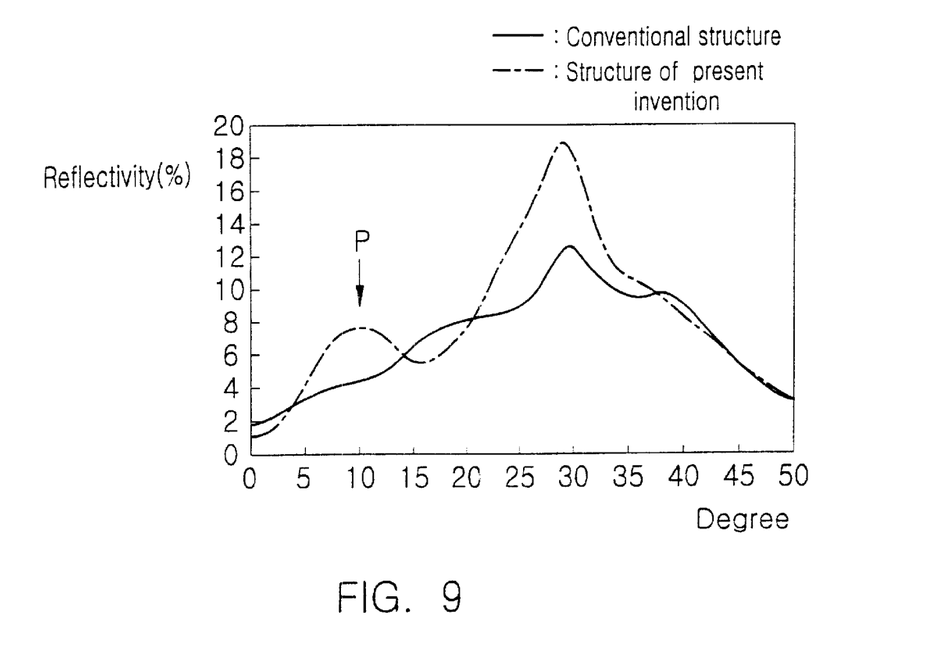
FIG. 9 is a graphical representation of the reflectivity of the conventional reflection type liquid crystal display having bumps as shown in FIG. 1 and the reflection type liquid crystal display device of the present invention having bumps as shown in FIG. 8.

Referring to FIG. 1, a reflection electrode 4 of a conventional reflection type liquid crystal device has bumps where a convex portion 6a and a concave portion 6b occur alternately. However, bumps of reflection electrode 4 are simple. Therefore, as shown in the graph of FIG. 9, such a conventional reflection type liquid crystal device has an extremely low reflectivity of approximately 13% when the angle of the incident light is −30° at which the reflectivity in general is the highest.

Reference numerals 2 and 6 denote a first insulation film and a second insulation film.

Moreover, in such a conventional method for forming a reflection electrode having bumps, an organic insulation film that is used for forming a bumpy organic insulation film pattern may not be photo-sensitive. Therefore, a first photolithography process for forming a contact hole to the organic insulation film, and a second photolithography process for forming bumps are required.

SUMMARY OF THE INVENTION

It is therefore an object of the present invention to enhance a reflectivity of a reflection electrode in a reflection type liquid crystal display device.

It is another object of the present invention to simplify a process for manufacturing a reflection electrode having bumps in a reflection type liquid crystal display device.

To achieve the above objects and other advantages, there is provided a reflection type liquid crystal display device that has a reflection electrode on its thin film transistor substrate. The reflection electrode has at its surface a convex portion and a concave portion. The top of the convex portion is caved or has a dimple. A method for fabricating a reflection type liquid crystal display is also provided. A photosensitive organic insulation film is used to form a bump to achieve a high reflectivity. A heat flow method is used for fabricating a bump on the insulative organic film. The present invention improves the reflectivity of the device and simplifies the manufacturing process.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown.

This invention may, however, be embodied in many different forms and should not be construed as limited to the embodiments set forth herein. The reflection type liquid crystal display device of the present invention always uses an organic insulation film having photo-sensitive and insulative characteristics, for all over the embodiments of forming thin film transistors having reflection electrodes provided with bumps.

Figure 3A:
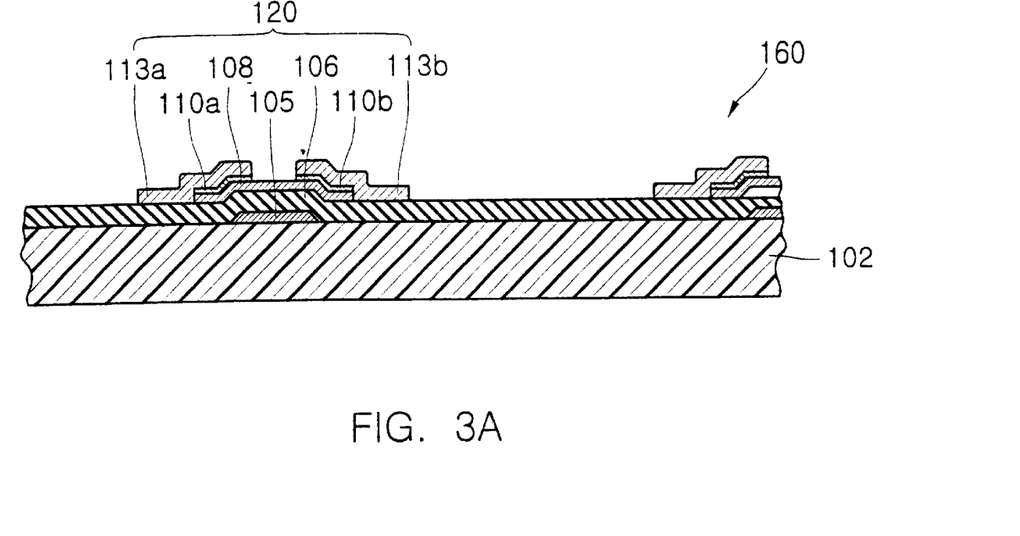
FIGS. 3A through 3E illustrate a process for forming a lower substrate of a reflection type liquid crystal display device according to a first embodiment of the present invention.

Referring to FIG. 3A, a metal layer is deposited by a sputtering method to a thickness of approximately 3000 Å onto a transparent or a light shielding insulation substrate, for example, a glass substrate. Here, the metal layer is made up of aluminum, aluminum alloy, chrome, molybdenum, or tantalum. The metal layer is patterned by photolithography, to form a gate line (not shown) and a gate electrode 105 extending from the gate line.

Subsequently, a gate insulation film 106 of silicon nitride ($Si_xN_y$, x and y are integers) or silicon oxide ($SiO_2$) is formed to a thickness of 4000Å onto an insulation substrate 102 having a gate electrode 105 by a plasma enhanced chemical vapor deposition method.

Subsequently, an amorphous silicon (a-Si) layer having a thickness of approximately 1000 Å and an amorphous silicon layer highly doped with n-type impurities (n+a-Si) having a thickness of approximately 400 Å are sequentially formed. Then, the doped amorphous silicon (n+a-Si) layer and the amorphous silicon (a-Si) layer formed thereunder are patterned, to form a semiconductor layer 108 serving as a channel layer 110a and a contact layer 110b.

Then, a metal layer of chrome, chrome-tungsten (W), or molybdenum is deposited all over substrate 102 by a sputtering method. Subsequently, the metal layer is patterned, to form a source line (not shown), a source electrode 113a formed integrally with the source line and extending from the source line, and a drain electrode 113b. Thus, a substrate 160 having a TFT 120 thereon can be obtained.

Figure 3B:
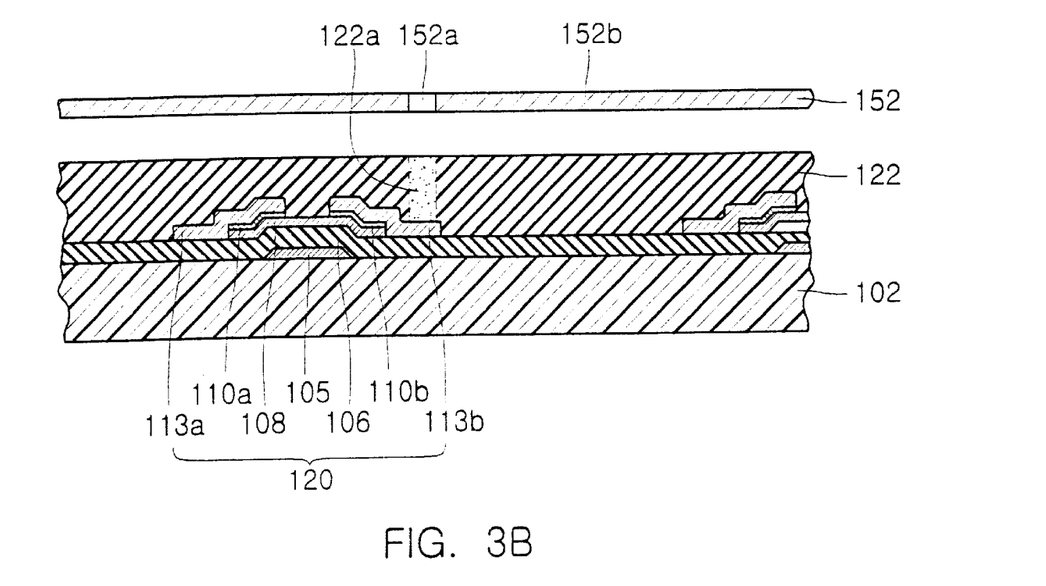

Now referring to FIG. 3B, a photoresist organic insulation film 122 having a thickness of approximately 2 µm to 4 µm is formed all over the substrate 160.

To allow contact of drain electrode 113b of TFT 120, a first mask 152 including a first light transmitting area 152a and a first light shielding area 152b is aligned such that the first light transmitting area 152a is positioned on the drain electrode 113b. Subsequently, the substrate is first exposed for a time period sufficient for the photo-sensitive organic insulation film 122 to be exposed to its bottom. In the preferred embodiment, the period is approximately 6000 milliseconds.

Figure 3C:
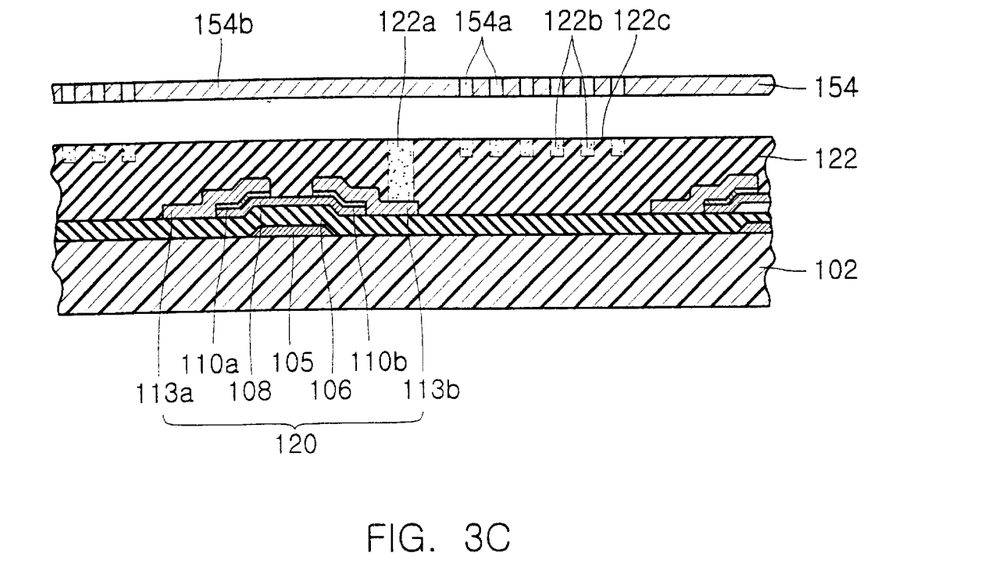

Referring to FIG. 3C, a second mask 154 including a plurality of second light transmitting areas 154a and a second light shielding area 154b is aligned on the substrate 102 in such a manner that second light transmitting areas 154a are positioned in a pixel area. Subsequently, a second exposure is performed for a time period of 2000 milliseconds, one third of the first exposure.

Figure 2:
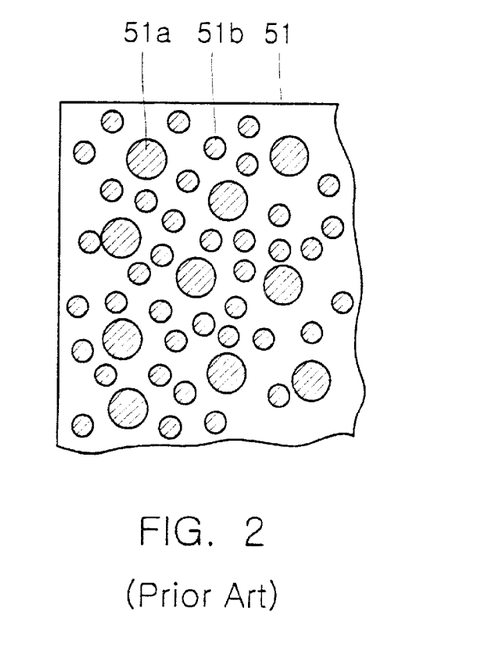
FIG. 2 is a schematic partial plan view showing a mask for forming bumps shown in FIG. 1.

As shown in FIG. 3C, a first exposed portion 122a is deeper than a second exposed portion 122b. Here, as shown in FIG. 2, light shielding area 154b of the second mask 154 for second exposure includes a first light shielding area 51a that is shaped as a circle and has a first diameter and a second light shielding area 51b that is shaped as a circle and has a second diameter. The second diameter is the same as or shorter than the first diameter.

Then, the first exposed portion 122a and the second exposed portion 122b are developed and removed. Hereinafter, projections 122c formed by the aforementioned exposure and development processes will be referred to as bumps. Bumps 122c are formed to correspond to the shape of first and second light shielding areas 51a and 51b of second mask 154, and thus are shaped as a cylinder.

Figure 3D:
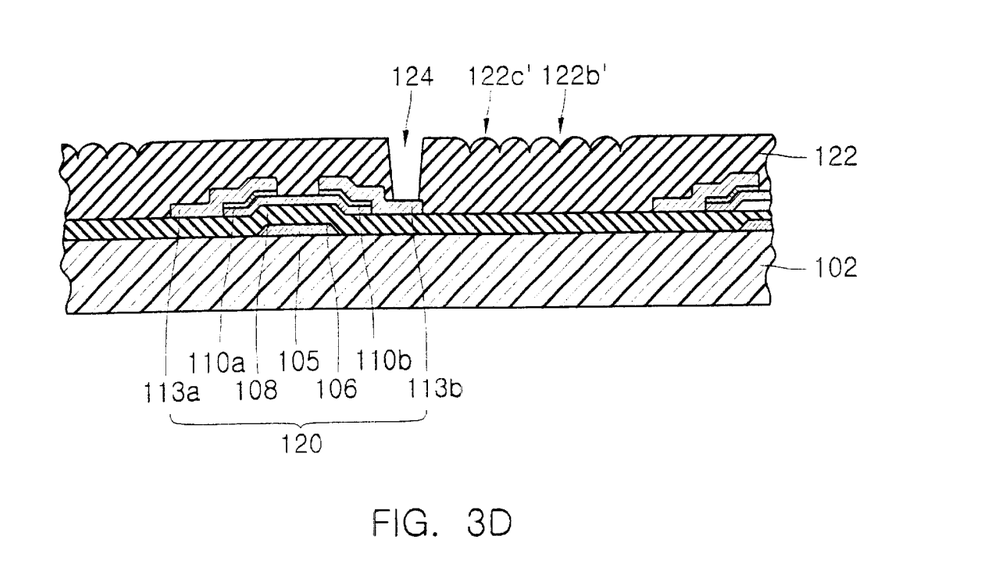

Referring to FIG. 3D, the substrate that finished the development process is heattreated at a temperature of approximately 120° C. to 250° C. Thus, a plurality of bumps 122c flow so that organic insulation film 122 in the pixel area alternately has convex portions 122c' and concave portions 122b'. Here, convex portion 122c' is shaped as a hemisphere. Thus, the resulting organic insulation film in the pixel area serves as a micro lens that reflects the incident light more focused at a higher density as compared with the flat surface.

Figure 3E:
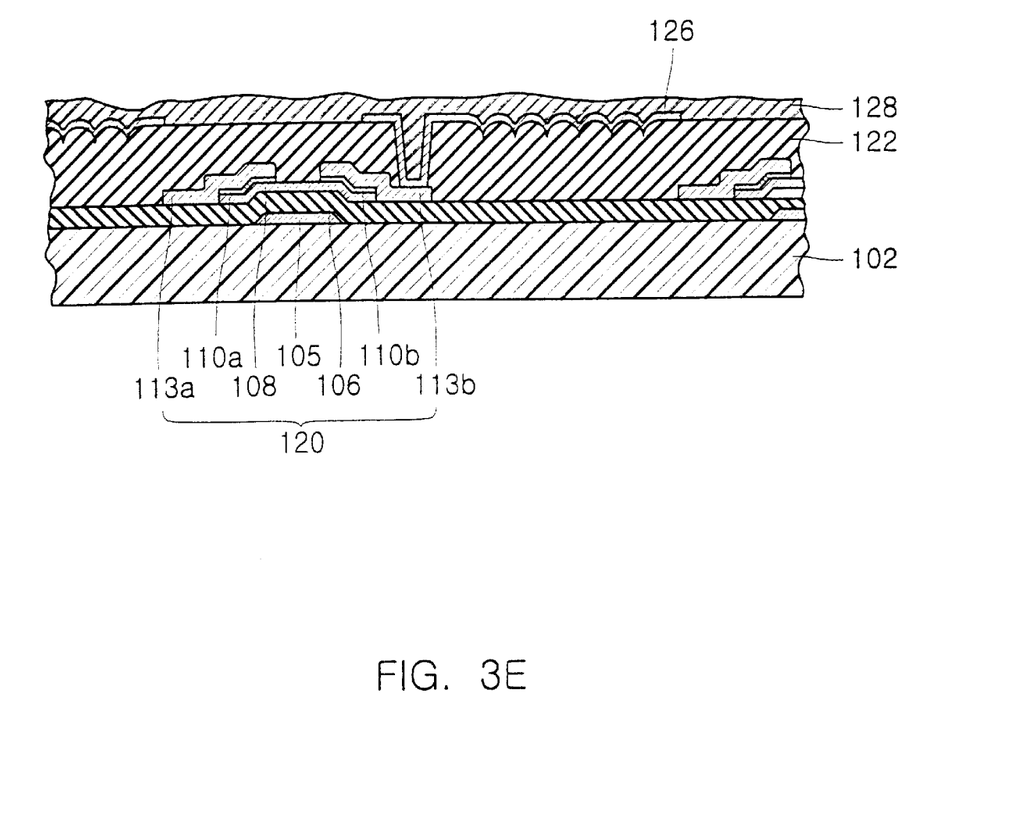

Referring to FIG. 3E, a metal layer having a high reflectivity and a low resistance like aluminum is deposited onto the photo-sensitive organic insulation film 122 having a contact hole 124. Then, the deposited metal layer is patterned, to thereby form a reflection electrode 126 that contacts drain electrode 113b and is disposed in the pixel area.

Subsequently, an alignment film 128 for aligning pre-tilting liquid crystal molecules to a selected angle is deposited all over the insulation film 122 having a reflection electrode 126.

According to the above-described embodiment, the photo-sensitive organic insulation film is used for forming in a pixel area a reflector film having a structure of alternating convex portions and concave portions. Therefore, since the omission of the photoresist film deposition simplifies the overall process as compared with those of the conventional method of forming a substrate having a reflection type electrode with such a convex-concave structure.

Although the embodiment of present invention is for the structure in that convex and concave portions are formed only in the pixel area, such a structure may be extended to the upper portion of source and gate lines.

Figure 4:
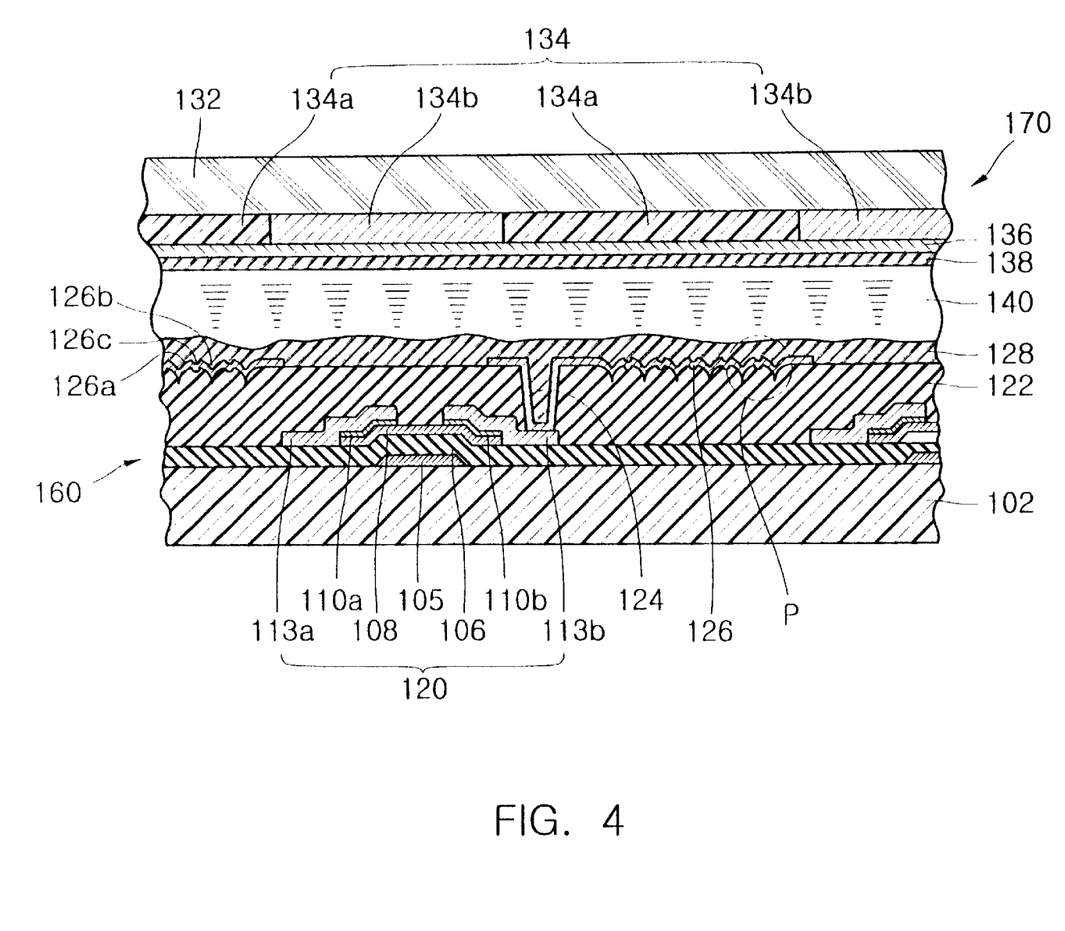
FIG. 4 is a schematic section view showing a reflection type liquid crystal display device according to a second embodiment of the present invention.

As shown in FIG. 4, a first insulation substrate 132 which is transparent and has a color filter layer and a transparent electrode at an inner surface thereof, and a second insulation substrate 102 which has a TFT and a reflection electrode are disposed in such a manner that first and second insulation substrates 132 and 102 face each other, having a liquid crystal layer 140 inserted therebetween.

Figure 5:
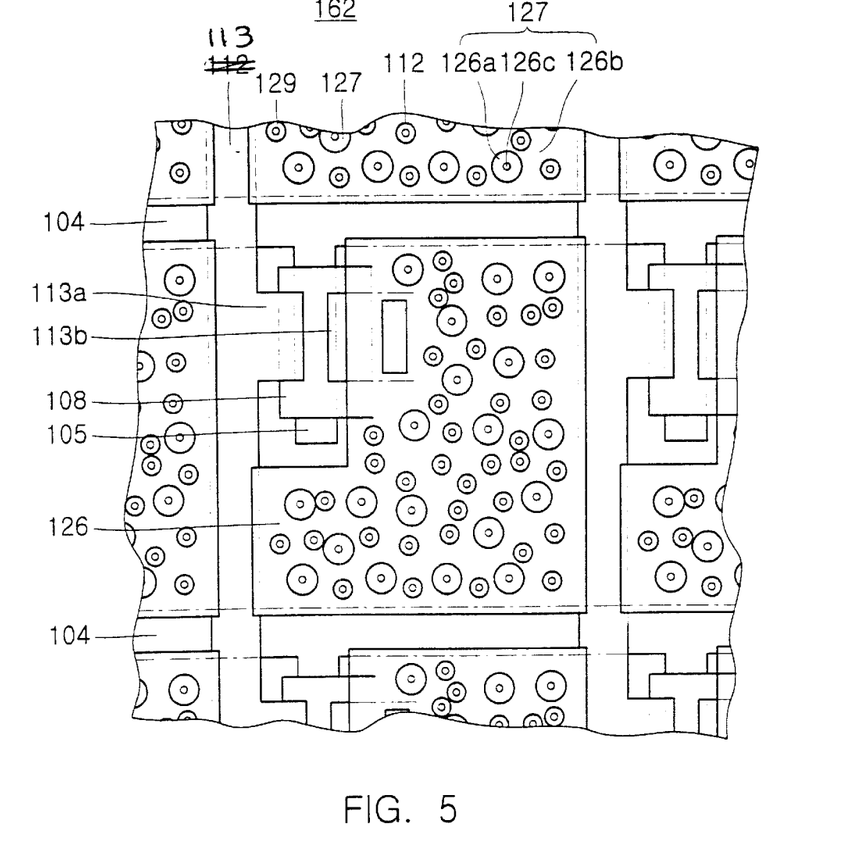
FIG. 5 is a schematic partial plan view of a lower substrate of the reflection type liquid crystal display device shown in FIG. 4.

Referring to FIGS. 4 and 5, gate electrode 105 is disposed onto the light transmitting second insulation substrate 102, such as a glass. Gate electrode 105 is expanded vertically from gate lines 104 of FIG. 5 that are arranged in parallel by a predetermined distance. In the above-described embodiment, the gate electrode 105 consists of dual layers of Cr and Al-Nd, respectively.

Gate insulation film 106 is formed all over the substrate having gate electrode 105. Gate insulation film 106 is made up of a silicon oxide ($SiO_2$) or a silicon nitride ($Si_xN_y$, x and y are integers).

Semiconductor layer 108 that serves as a channel layer is formed on gate insulation film 106. Contact layers 110a and 110b, i.e., an amorphous semiconductor (n+a-Si) layer on which n-type impurities are doped at high density, are disposed at both ends of semiconductor layer 108.

Contact layers 110a and 110b are in contact with source electrode 113a and drain electrode 113b that are respectively formed thereon. As shown in FIG. 5, source electrode 113a is extended from source line 113 that traverses gate line 104, insulated by the gate insulation film 106. TFT 120 is made up of gate electrode 105, gate insulation film 106, semiconductor layer 108, contact layers 110a and 110b, and source and drain electrodes 113a and 113b.

Photo-sensitive organic insulation film 122 is deposited all over the substrate including TFT 120, source line 113, and gate line 104.

Figure 8:
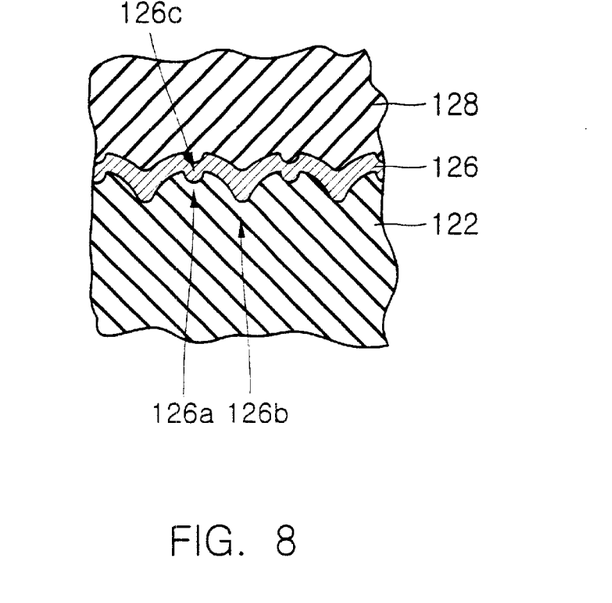
FIG. 8 is a detail view showing the portion P1 of FIG. 6E.

As shown in FIG. 8, an expanded view of portion P of FIG. 4, the photo-sensitive organic insulation film 122 has at the surface thereof a hemispheric convex portion 126a and a concave portion 126b. Convex portion 126a further has at a top thereof a dimple 126c.

Contact hole 124 for partially exposing drain electrode 113b is formed at the photo-sensitive organic insulation film 122. Reflection electrode 126 is disposed in the pixel area on photoresist organic insulation layer 122 including contact hole 124. Reflection electrode 126 has a structure that is similar to those of the surface of photoresist organic insulation Ad) film 122. In other words, reflection electrode 126 has a structure that has a hemispheric convex portion and a concave portion alternately, and the convex portion further has a dimple at its top.

As shown in FIG. 5, convex portions 126a are disposed irregularly within the reflection electrode area, and shaped as a circle on a plan view.

Convex portion 126a includes a first portion 127 having a first diameter, and a second portion 129 having a second diameter shorter than the first diameter. First portion 127 has a diameter of approximately 8 µm to 12 µm, and second portion 129 has a diameter of approximately 4 µm to 6 µm. Dimple 126c has a diameter of approximately 1 µm to 3 µm. First portion 127 and second portion 129 may have dimples 126c with the same or different diameters.

First portion 127 and second portion 129 may have different heights so as to enhance a reflectivity. In the embodiment of the present invention, first portion 127 has a height higher than that of second portion 129.

Figure 10:
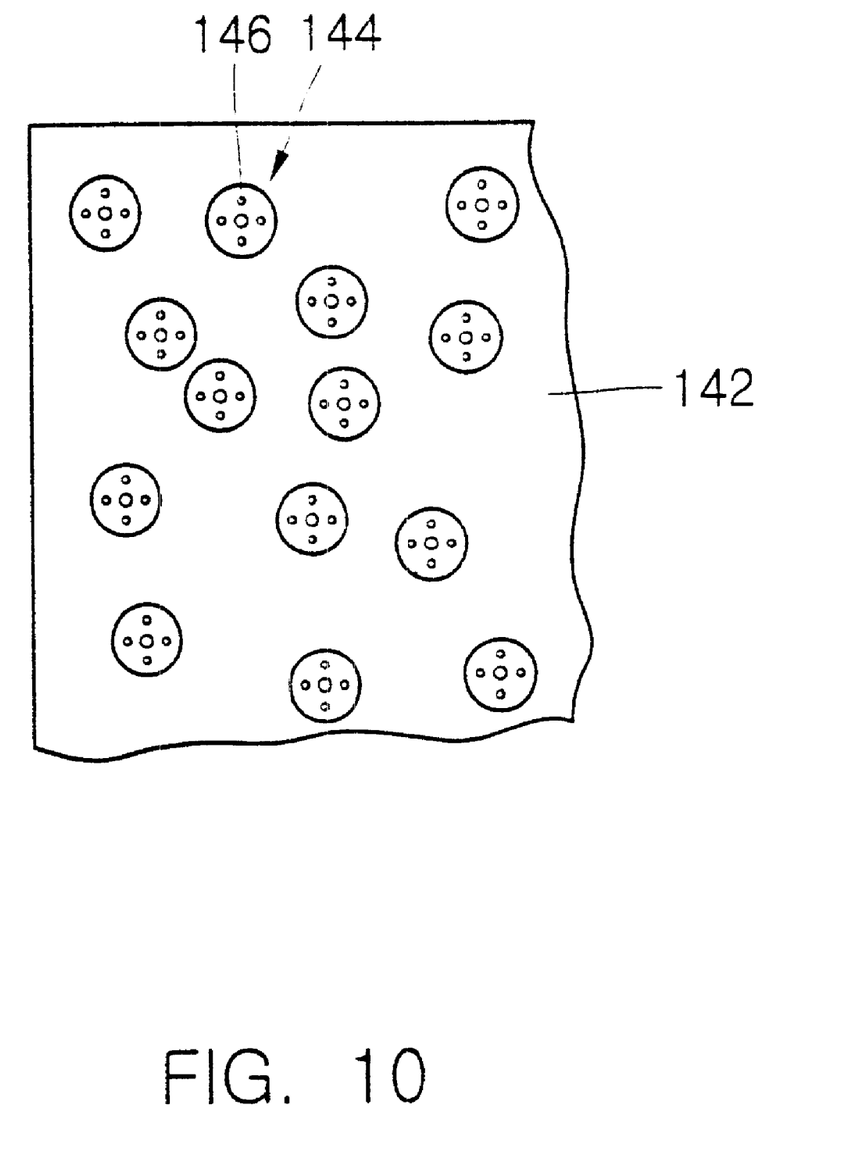
FIG. 10 is a partial plan view of a reflector film of a reflection type liquid crystal display device according to a fourth embodiment of the present invention.

As shown in FIG. 10, a single convex portion 144 may have a plurality of dimples 146 in order to further effectively enhance the reflectivity of reflection electrode.

As a result, the reflectivity is enhanced by 6% to 7% as compared with the conventional convex-concave structure, when the incident light is at −30°, as shown in FIG. 9.

Referring back to FIG. 4, a color filter layer 134a is formed in the pixel area at the inner surface of first insulation substrate 132 that is transparent, and a black matrix 134b is formed at the portion corresponding to TFT 120. Black matrix 134b serves to prevent a Up degradation of TFT 120 caused by the light which is projected at the state where the voltage is not applied to the liquid crystal (i.e., when liquid crystal is off) and drives TFT 120. Black matrix 134b also serves to prevent a light leakage that may occur among color filters.

A transparent electrode 136 is disposed at the lower surface of color filter layer 134, and an alignment film 138 is disposed at the lower surface of transparent electrode 136. In addition, although not shown, a polarizer plate for polarizing the incident light is disposed at the outer surface of first insulation substrate 132, and a phase shifting plate for shifting the phase of the polarized incident light is inserted between the polarizer plate and the outer surface of the first substrate 132.

The reflection type liquid crystal display device having the above-described structure operates as follows.

When the voltage is not applied to the liquid crystal, the light coming from the above of color filter substrate 170 changes to a linearly polarized light as passing through the polarizer plate and changes again to a counterclockwise (or clockwise) polarization as passing through the phase shifting plate. Then, the counterclockwise (or clockwise) polarization is changed again to a linearly polarized light as passing through the liquid crystal layer, and reaches the reflection electrode. The reflected linearly polarized light is changed to a counterclockwise (or clockwise) polarization as passing through the liquid crystal layer, and changes again to a linearly polarized light as passing through the phase shifting plate. Thus, the linearly polarized light passes through the polarizer plate. As a result, the liquid crystal display device becomes white state.

On the contrary, if the voltage is applied to the liquid crystal, the counterclockwise (or clockwise) polarization passes through the liquid crystal layer without any change, not recognizing the birefringence, and the counterclockwise (or clockwise) polarization changes to the clockwise (or counterclockwise) polarization, with the phase shifted by the reflection electrode. The clockwise (or counterclockwise) polarization changes to the linearly polarized light that has rotated 90° against the incident light as passing through the phase shifting plate. Then, the linearly polarized light is absorbed by the polarizer plate. As a result, the liquid crystal display device becomes dark state.

Now, a method for fabricating the reflection type liquid crystal display device having the structure shown in FIGS. 4 and 5 will be explained.

Figure 6A:
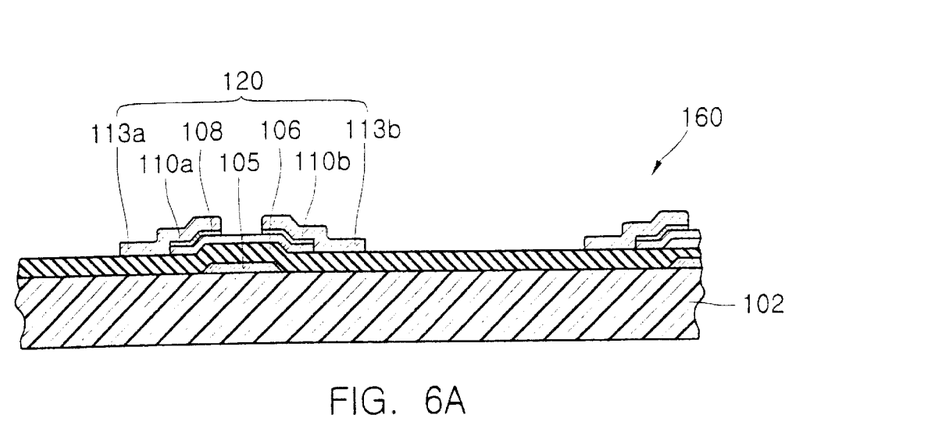
FIGS. 6A through 6E illustrate a process for forming the lower substrate of the reflection type liquid crystal display device shown in FIG. 4 according to a third embodiment of the present invention.

Referring to FIG. 6A, a metal layer composed of one selected from chrome, aluminum, aluminum alloy, or molybdenum is deposited to a thickness of approximately 3000 Å onto the light transmitting or shielding insulation substrate. The metal layer is patterned by photolithography, to form gate line 104 and gate electrode 105 that extends from gate line 104 shown in FIG. 5.

Subsequently, gate insulation film 106 made up of a silicon nitride ($Si_xN_y$, x and y are integers) or a silicon oxide ($SiO_2$) is formed to a thickness of 4000 Å onto insulation substrate 102 having gate electrode 105 by plasma enhanced chemical vapor deposition method.

Subsequently, an amorphous silicon (a-Si) layer having a thickness of approximately 1000 Å and an amorphous silicon layer heavily doped with high-density n-type impurities (n+a-Si) having a thickness of approximately 400 Å are sequentially formed. Then, the heavily doped amorphous silicon (n+a-Si) layer and the underlying amorphous silicon (a-Si) layer are patterned, to thereby form semiconductor layer 108 that serves as channel layer 110a and contact layer 110b.

Then, a metal layer of chrome or molybdenum is deposited to a thickness of 2000 Å all over the substrate 102 by a sputtering method. Subsequently, the metal layer is patterned, to form source line 113, source electrode 113a formed integrally with the source line 113 and extending from source line 113, and drain electrode 113b, as shown in FIG. Thus, a substrate 160 having TFT 120 thereon can be obtained.

Figure 6B:
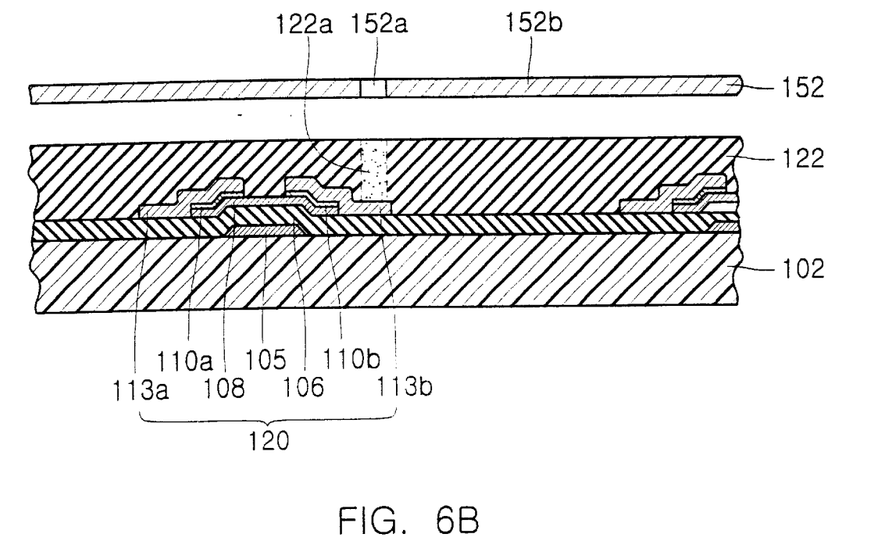

Referring to FIG. 6B, a photo-sensitive organic insulation film 122 is formed all over the substrate 160 to a thickness of 2 μm to 4 μm. Here, the photo-sensitive organic insulation film 122 is a positive type that removes the exposed portion by a development process.

To allow contact of drain electrode 113b of TFT 120, first mask 152 including first light transmitting area 152a and first light shielding area 152b is aligned such that first light transmitting area 152a is positioned onto drain electrode 113b of substrate 102. Subsequently, the substrate is first exposed for a time period sufficient for exposing the photo-sensitive organic insulation film 122 through its bottom. For the preferred embodiment, the time period is approximately 6000 milliseconds. Reference numeral 122a denotes the first exposed portion.

Figure 6C:
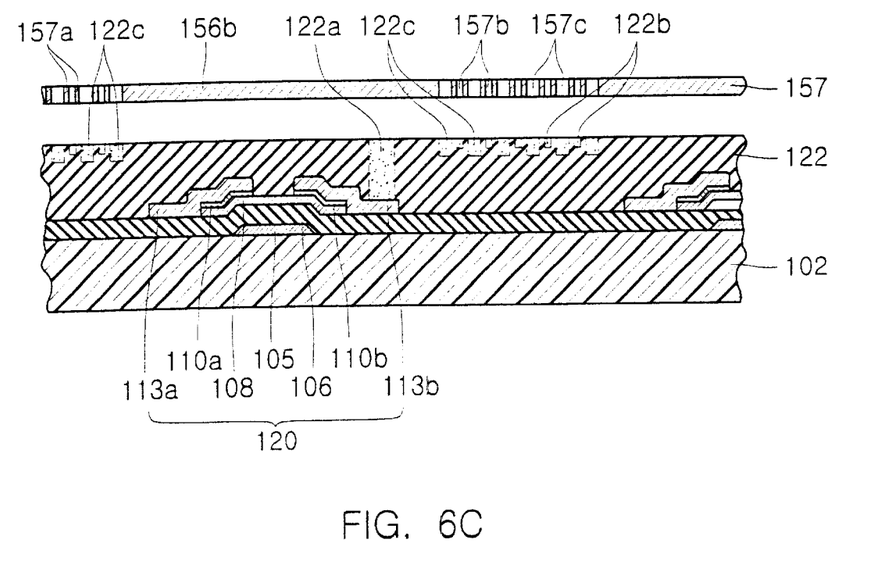
Figure 7:
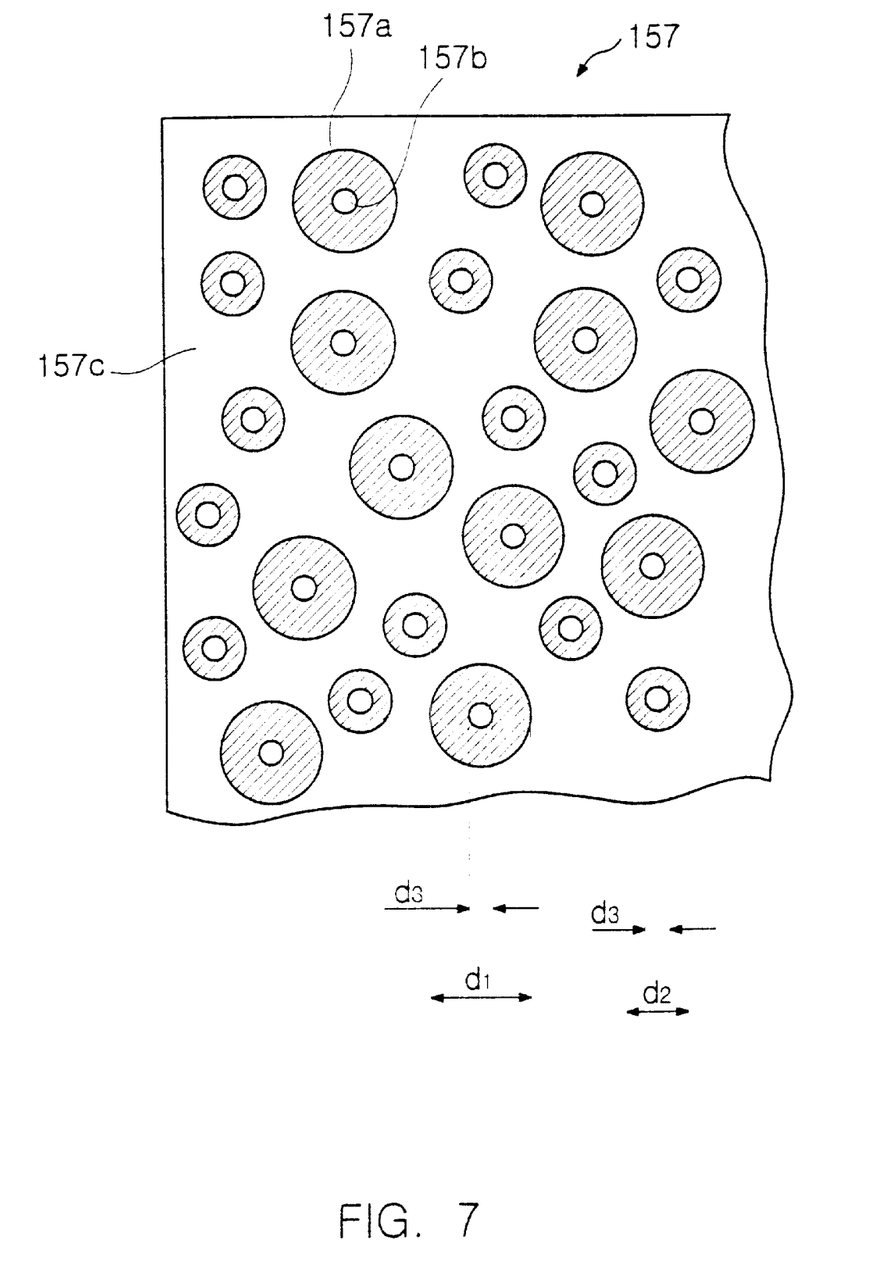
FIG. 7 is a plan view showing the mask of FIG. 6C.

Referring to FIGS. 6C and 7, a second mask 157 including a ring-shaped second light shielding area 157a and a circular second light transmitting area 157b in second light shielding area 157a, and a third light transmitting area 157c among second light shielding area 157a is aligned on substrate 102 in such a manner that second light shielding area 157a and second light transmitting area 157b are positioned in a pixel area. Subsequently, a second exposure is performed for a time period of 2000 milliseconds, one third of those of first exposure. Here, second light shielding areas 157a have diameters different from each other, which is desirable for an enhancement of reflectivity. Reference numeral 122b denotes the portion exposed by second light transmitting area 157b, and reference numeral 122c denotes the portion exposed by third light transmitting area 157c.

Selectively, second light transmitting area 157a may have a first diameter d1 and a second diameter d2 as shown in FIG. 7. Preferably, first diameter d1 is approximately 8 μm to 12 μm, and second diameter d2 is 4 μm to 6 μm. Here, the space among second light shielding areas 157a is maintained at 2 μm.

Selectively, second light transmitting areas 157b may have same diameter, wherein the diameter is 2 μm to 4 μm, preferably.

Subsequently, the substrate is developed to remove the portions that are exposed through the first and second exposure process.

Figure 6D:
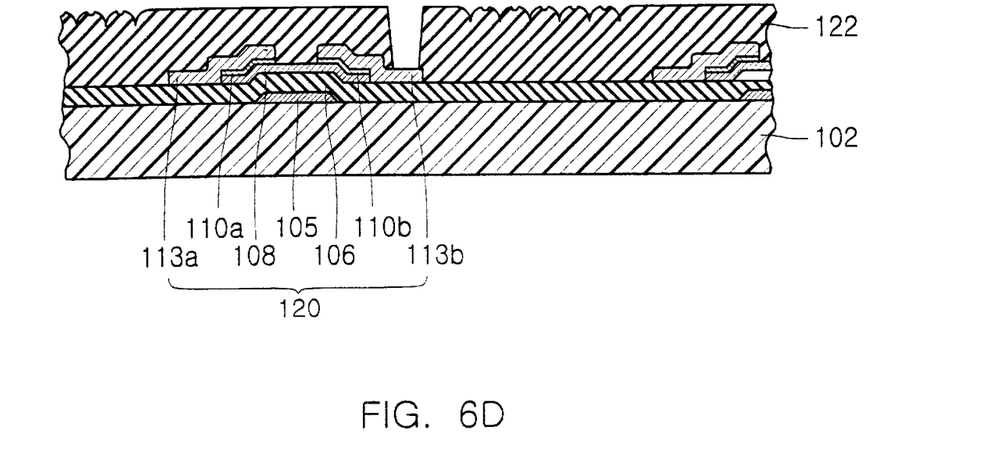

Referring to FIG. 6D, the substrate that finished development is heat-treated at a temperature of approximately 120° C. to 250° C. Thus, as shown in FIG. 8, a plurality of bumps among the exposed portions flow, and the photo-sensitive organic insulation film 122 in the pixel area has convex portion 122a and concave portion 122b alternately and convex portion 122a further has dimple 122c at the top thereof. As a result, the resultant photo-sensitive organic insulation film 122 in the pixel area serves as a micro lens for reflecting the incident light more focused at high density as compared with the flat surface.

Figure 6E:
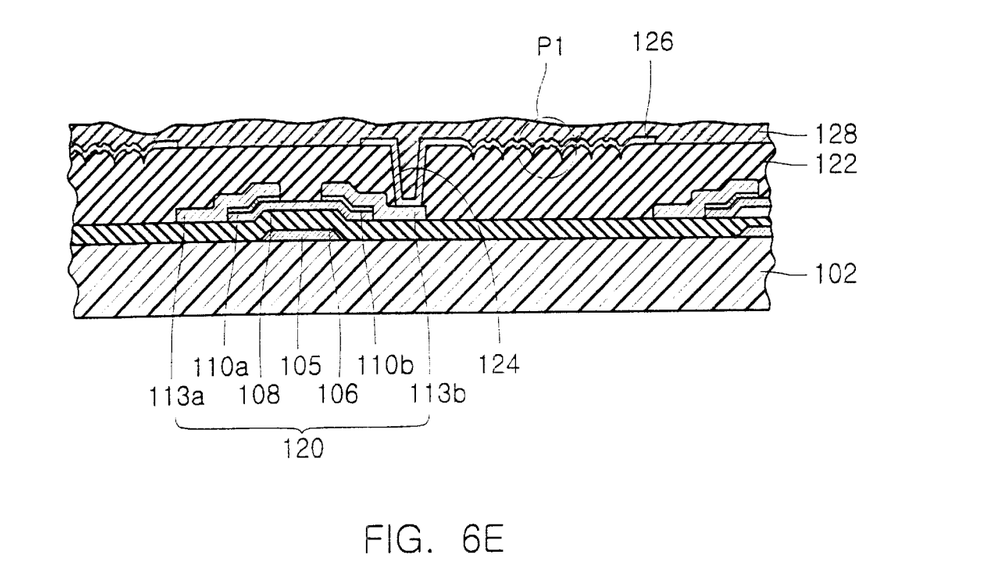

Referring to FIG. 6E, a metal layer having a high reflectivity and a low resistance like aluminum is deposited onto the photoresist organic insulation film having a contact hole. Then, the deposited metal layer is patterned, to thereby form reflection electrode 126 that contacts a drain electrode and is disposed in the pixel area.

Reflection electrode 126 has a structure that is similar to those of the surface of the photo-sensitive organic insulation film 122. In other words, reflection electrode 126 has hemispheric convex and concave portions alternately, and the convex portion further has a dimple at its top.

Alignment film 128 for arranging pre-tilting liquid crystal molecules at a certain angle is deposited all over the photo-sensitive organic insulation film 122 having reflection electrode 126.

A color filter substrate having a transparent electrode at the inner surface thereof is manufactured in the same manner as a conventional device.

According to an embodiment of the present invention, since the photoresist film deposition process may be omitted, the overall process is simplified as compared with the conventional method of forming a substrate having a reflection type electrode with such a convex-concave structure.

The above-described embodiments have a single second light transmitting area in the second light shielding area. However, it is preferable to have a plurality of circular second light transmitting areas in the second light shielding area, so as to obtain an enhanced reflectivity.

Thus, as shown in FIG. 10, a single convex portion 144 may have a plurality of dimples 146.

In the above-described embodiments, a positive type photo-sensitive organic insulation film is used. However, a negative type photo-sensitive organic insulation film that leaves the exposed portion and removes the unexposed portion may also be used. It is required that the first mask and the second mask used for the negative type photo-sensitive organic insulation film have a light shielding area and a light transmitting area that are opposite to those for positive type photo-sensitive organic insulation film.

The reflection type liquid crystal display device of the present invention is provided with a reflection electrode having a convex-concave structure, wherein the convex portion of the reflection electrode further has a dimple. That is, as shown in FIG. 9, the reflectivity is enhanced by 6% to 7% as compared with the conventional convex-concave structure, when the incident light is at −30°, as shown in FIG. 9. The reflectivity is also enhanced at 10° (position P of FIG. 9). Therefore, if a lens is optimized to have a specific angle of approximately 0°, a holographic effect may be obtained. Using such a method, a reflection type liquid crystal display device may have a high reflectivity at its front surface.

Moreover, the present invention uses the photo-sensitive organic insulation film without using a photoresist film mask, thus increasing only the number of times of exposures, thereby simplifying the overall process.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

What is claimed is:

1. A method for fabricating a reflection type liquid crystal display, comprising steps of:

forming a switching element having a source, a drain, and a gate on an insulation substrate;

depositing a photo-sensitive organic insulation film to a first thickness onto the insulation substrate;

performing a first exposure for a first time period using a first mask such that the photo-sensitive organic insulation film on a portion of the drain is completely exposed;

performing a second exposure for a second time period using a second mask such that the photo-sensitive organic insulation film is exposed to a depth shallower than that of the first exposure;

developing and removing the first exposed portion and the second exposed portion;

flowing the photo-sensitive organic insulation film by heating; and forming a reflection electrode onto a selected portion of the photo-sensitive organic insulation film.

2. The method according to claim 1, wherein the second time period is one third of the first time period.

3. The method according to claim 2, wherein the photo-sensitive organic insulation film is 2 μm to 4 μm thick, the first time period is approximately 6000 milliseconds, and the second time period is approximately 2000 milliseconds.

4. The method according to claim 1, wherein the second mask is for an irregularly disposed circle pattern.

5. The method according to claim 4, wherein the circle pattern has a different diameter.

6. A method for fabricating a reflection type liquid crystal display, comprising steps of:

forming a switching element having a source, a drain, and a gate on an insulation substrate;

depositing a photo-sensitive organic insulation film to a first thickness onto the insulation substrate;

performing a first exposure for a first time period using a first mask of which first light transmitting area is positioned at the photoresist organic insulation film on a portion of the drain, and of which light shielding area is positioned at the rest of the photo-sensitive organic insulation film, in such a manner that a portion of the photo-sensitive organic insulation film under the light transmitting area of the first mask is completely exposed;

performing a second exposure for a second time period using a second mask including a ring-shaped second light shielding area and a circle-shaped second light transmitting area within the second light shielding area, in such a manner that a portion of the photo-sensitive organic insulation film is exposed to a depth shallower than the first exposure;

developing and removing the first exposed portion and the second exposed portion;

flowing the photo-sensitive organic insulation film by heating; and forming a reflection electrode onto a portion of the photo-sensitive organic insulation film.

7. The method according to claim 6, wherein the second time period is one third of the first time period.

8. The method according to claim 7, wherein the photo-sensitive organic insulation film is 2 μm to 4 μm thick, the first time period is approximately 6000 milliseconds, and the second time period is approximately 2000 milliseconds.

9. The method according to claim 6, wherein the second light shielding area of the second mask have different diameters.

10. The method according to claim 9, wherein the second light shielding area of the second mask has a first diameter and a second diameter.

11. The method according to claim 10, wherein the first diameter is approximately 8 μm to 12 μm and the second diameter is approximately 4 μm to 6 μm.

12. The method according to claim 9, wherein a space between the second light shielding areas of the second mask is approximately 2 μm.

13. The method according to claim 6, wherein the second light transmitting areas of the second mask have the same diameter.

14. The method according to claim 13, wherein the second light transmitting areas of the second mask have a diameter of approximately 1 μm to 3 μm.

15. The method according to claim 6, wherein the second light transmitting areas are disposed in plurality in the second light shielding area.

* * * * *